No. 729,833. Patented June 2, 1903.

UNITED STATES PATENT OFFICE.

HARRY SKILES AMWAKE, OF CAMDEN, NEW JERSEY.

SOLUTION FOR PRIMARY BATTERIES.

SPECIFICATION forming part of Letters Patent No. 729,833, dated June 2, 1903.

Application filed May 22, 1900. Serial No. 17,519. (No specimens.)

*To all whom it may concern:*

Be it known that I, HARRY SKILES AMWAKE, a citizen of the United States of America, and a resident of Camden, county of Camden, and State of New Jersey, have invented certain new and useful Improvements in Solutions for Primary Batteries, of which the following is a specification.

My invention relates to the electrolytes or solutions which are used in those primary electric batteries which are constructed with porous porcelain divisions.

My object is to secure maximum efficiency of electromotive force by increasing the voltage of the battery, and I find, as set forth in the following specification, which describes a combination of acid and alkaline solutions, that a greatly-increased efficiency is obtained.

While technically my solutions would be termed "double fluid," I desire it to be understood that it is only in the combination of the two (making practically but one fluid) that there is the value I have discovered. For instance, a solution of sodium hydrate and water by itself is old and has a well-known and certain value as an electrolyte. I do not use it alone, and I do not claim it broadly, but only as an old element, which in my combination with other materials produces new and useful effects.

In preparing my combination of acid and alkaline electrolytes the elements or parts used are sodium hydrate, sulfuric acid, sodium bichromate, and water. They are mixed and combined as follows: First, saturate and dilute sodium hydrate with water and allow it to cool, (the preferable proportions are seven parts of sodium hydrate and ten parts of water, by weight;) second, saturate and dilute sodium bichromate with water, then add sulfuric acid and allow it to cool. The preferable proportions are five parts sodium bichromate, nine parts sulfuric acid, and ten parts water, by weight. All the proportions given may be varied within certain limits, which only experiment can determine. Place the sodium-hydrate solution inside the porous porcelain plates and the sodium-bichromate solution on their outside, and the two mixtures will unite and combine by gradual percolation through the porous plates and an electrical energy developed which greatly increases the voltage of the battery.

What I claim as new is—

In a primary electric battery of the porous-diaphragm type, an electrolyte on one side of the diaphragm comprising seven parts of sodium hydrate and ten parts of water and an electrolyte on the other side of the diaphragm comprising five parts of sodium bichromate, nine parts of sulfuric acid and ten parts of water.

Signed at Philadelphia this 18th day of May, 1900.

HARRY SKILES AMWAKE.

Witnesses:
JOS. H. WILSON,
JAS. W. ROBERTSON.